US006662196B2

United States Patent
Holenstein et al.

(10) Patent No.: US 6,662,196 B2
(45) Date of Patent: Dec. 9, 2003

(54) COLLISION AVOIDANCE IN BIDIRECTIONAL DATABASE REPLICATION

(75) Inventors: Bruce D. Holenstein, Media, PA (US); Paul J. Holenstein, Downingtown, PA (US); Gary E. Strickler, Pottstown, PA (US)

(73) Assignee: ITI, Inc., Paoli, PA (US)

( * ) Notice: Subject to any disclaimer, the term of this patent is extended or adjusted under 35 U.S.C. 154(b) by 340 days.

(21) Appl. No.: 09/810,674

(22) Filed: Mar. 16, 2001

(65) Prior Publication Data

US 2003/0187884 A1 Oct. 2, 2003

(51) Int. Cl.⁷ .............................................. G06F 17/30
(52) U.S. Cl. ............................ 707/202; 707/204; 707/8
(58) Field of Search ................................. 707/201, 202, 707/204, 8, 200

(56) References Cited

U.S. PATENT DOCUMENTS

| | | | |
|---|---|---|---|
| 5,036,518 A | | 7/1991 | Tseung |
| 5,095,421 A | * | 3/1992 | Freund ........................ 709/101 |
| 5,276,871 A | | 1/1994 | Howarth |
| 5,452,445 A | * | 9/1995 | Hallmark et al. ............... 707/2 |
| 5,579,318 A | | 11/1996 | Reuss et al. |
| 5,615,364 A | | 3/1997 | Marks |
| 5,680,573 A | | 10/1997 | Rubin et al. |
| 5,710,922 A | | 1/1998 | Alley et al. |
| 5,721,915 A | | 2/1998 | Sockut et al. |
| 5,721,916 A | | 2/1998 | Pardikar |
| 5,721,918 A | | 2/1998 | Nilsson et al. |
| 5,734,898 A | * | 3/1998 | He ............................. 707/203 |
| 5,737,601 A | | 4/1998 | Jain et al. |
| 5,740,433 A | | 4/1998 | Carr et al. |
| 5,745,753 A | | 4/1998 | Mosher et al. |
| 5,757,669 A | | 5/1998 | Christie et al. |
| 5,758,150 A | | 5/1998 | Bell et al. |
| 5,778,388 A | * | 7/1998 | Kawamura et al. ......... 707/203 |
| 5,781,910 A | | 7/1998 | Gostanian et al. |
| 5,794,252 A | | 8/1998 | Bailey et al. |
| 5,799,305 A | * | 8/1998 | Bortvedt et al. ............... 707/10 |

(List continued on next page.)

OTHER PUBLICATIONS

Description of Two–Phase Commit Mechanism, Oracle8 Distributed Database Systems, Release 8.0, Document No. A58247–01, 1997, 3 pages.
Processing SQL Statements, Oracle7 Server Application Developer's Guide, 1996, 26 pages.
Data Concurrency, Oracle7 Server Concepts Manual, 1996, 28 pages.

(List continued on next page.)

*Primary Examiner*—Safet Metjahic
*Assistant Examiner*—Brian Goddard
(74) *Attorney, Agent, or Firm*—Akin Gump Strauss Hauer & Feld, L.L.P.

(57) ABSTRACT

A bidirectional database replication system includes a plurality of nodes. Each transaction at an originating node is paused prior to a commit operation. Ready to commit tokens are sent to the other nodes in the system to determine if the other nodes are prepared for the commit operation for the paused transaction. If all of the ready to commit tokens properly return to the originating node from the other nodes, thereby indicating that the other nodes are prepared for the commit operation, then the transaction is commited. For lengthy transactions, ready to sync tokens are assigned at one or more predesignated intermediate points in the transaction, and propagate throughout the system in a similar manner. The transaction continues to execute as long as all ready to sync tokens properly return to the originating node. The pause-before-commit and sync point schemes are used to avoid collisions at any of the nodes.

42 Claims, 4 Drawing Sheets

U.S. PATENT DOCUMENTS

| | | | |
|---|---|---|---|
| 5,799,306 A | | 8/1998 | Sun et al. |
| 5,799,322 A | | 8/1998 | Mosher, Jr. |
| 5,799,323 A | | 8/1998 | Mosher, Jr. et al. |
| 5,806,075 A | | 9/1998 | Jain et al. |
| 5,832,203 A | | 11/1998 | Putzolu et al. |
| 5,835,915 A | | 11/1998 | Carr et al. |
| 5,870,761 A | * | 2/1999 | Demers et al. ............. 707/201 |
| 5,884,325 A | | 3/1999 | Bauer et al. |
| 5,884,327 A | * | 3/1999 | Cotner et al. ............... 707/202 |
| 5,884,328 A | | 3/1999 | Mosher, Jr. |
| 5,924,095 A | * | 7/1999 | White ......................... 707/10 |
| 5,924,096 A | | 7/1999 | Draper et al. |
| 5,970,488 A | | 10/1999 | Crowe et al. |
| 5,991,771 A | | 11/1999 | Falls et al. |
| 6,012,059 A | | 1/2000 | Neimat et al. |
| 6,032,158 A | * | 2/2000 | Mukhopadhyay et al. .. 707/201 |
| 6,122,630 A | | 9/2000 | Strickler et al. |
| 6,243,702 B1 | * | 6/2001 | Bamford et al. ............... 707/8 |
| 6,243,715 B1 | * | 6/2001 | Bogantz et al. ............. 707/201 |
| 6,353,834 B1 | * | 3/2002 | Wong et al. ................. 707/202 |
| 6,493,726 B1 | * | 12/2002 | Ganesh et al. ............. 707/201 |

OTHER PUBLICATIONS

Image/SQL: Issues and answers concerning SQL tables, Hewlett–Packard Company, Nov. 29, 1995, 34 pages.

Q&A: Replication in Microsoft Access for Windows 95, Microsoft Office Developer Forum, Nov. 22, 1995, 8 pages.

Multi–Version Concurrency Control, PostgreSQL User's Guide, Index and Chapter 10, 60–63, 1996–99, 11 pages.

Bodin et al., "Evaluating Two Loop Transformations for Reducing Multiple Writer False Sharing", 7th Annual Workshop on Languages and Compiler for Parallel Computing, New York, Aug. 1994.

* cited by examiner

RTC TABLE A

| TIME | CONTENTS TRAN ID | FLAG |
|---|---|---|
| $t_1$ | | |
| $t_2$ | | |
| $t_3$ | | |
| $t_4$ | 101 | 0 |
| $t_5$ | 101 | 1 |
| $t_6$ | * | |
| ... | | |
| $t_n$ | | |

* NO ENTRY (TRAN ID 101 HAS BEEN DELETED FROM TABLE)

AUDIT TRAIL A

| TIME | HEADER TRAN ID | TABLE | DATA |
|---|---|---|---|
| $t_1$ | 101 | | BEGIN TRANS. 101 |
| $t_2$ | 101 | ACCOUNTS | SMITH, JOHN, DEBIT $10 |
| $t_3$ | 101 | ACCOUNTS | DOE, JANE, CREDIT $10 |
| $t_4$ | 101 | | RTC TOKEN 101 |
| $t_5$ | | | |
| $t_6$ | 101 | | COMMIT TRANS. 101 |

AUDIT TRAIL B

| TIME | HEADER TRAN ID | TABLE | DATA |
|---|---|---|---|
| $t_1+\alpha$ | 101 | | BEGIN TRANS. 101 |
| $t_2+\alpha$ | 101 | ACCOUNTS | SMITH, JOHN, DEBIT $10 |
| $t_3+\alpha$ | 101 | ACCOUNTS | DOE, JANE, CREDIT $10 |
| $t_4+\alpha$ | 101 | | RTC TOKEN 101 |
| $t_5+\alpha$ | | | |
| $t_6+\alpha$ | 101 | | COMMIT TRANS. 101 |

*Fig. 3*

COLLISION AVOIDANCE IN BIDIRECTIONAL DATABASE REPLICATION

BACKGROUND OF THE INVENTION

The present invention relates to the field of data replication.

"Bidirectional Database Replication" is specified as the application of database deltas (i.e., the results of transactions being performed against a database) from either of two databases in a pair to the other one. Transaction I/O (e.g., inserts, updates, and deletes) applied to one database are applied to the other database and vice-versa. Both databases are "live" and are receiving transactions from applications and/or end users. U.S. Pat. No. 6,122,630 (Strickler et al.), which is incorporated by reference herein, discloses a bidirectional database replication scheme for controlling transaction ping-ponging.

In the database world, a collision is classically defined as a conflict that occurs during an update. A collision occurs when a client reads data from the server and then attempts to modify that data in an update, but before the update attempt is actually executed another client changes the original server data. In this situation, the first client is attempting to modify server data without knowing what data actually exists on the server. Conventional techniques for minimizing or preventing collisions include database locking and version control checking. These techniques are commonly used in systems that have one database, wherein many users can access the data at the same time.

When a database system includes replicated databases, the problem of collisions becomes greater, since clients may be requesting database changes to the same data at the same physical or virtual location or at more than one physical or virtual locations. Collision or conflict detection schemes have been developed for replicated database systems. After a collision is detected, a variety of options are available to fix or correct the out-of-sync databases. However, it would be more desirable to prevent collisions from happening in the first place.

One conventional distributed transaction scheme used in Oracle distributed database systems is known as the "two-phase commit mechanism." A side effect of this scheme is often a degree of collision prevention. The two phases are prepare and commit. In the prepare phase, a global coordinator (i.e., the transaction initiating node) asks participants to prepare the transaction (i.e., to promise to commit or rollback the transaction, even if there is a failure). The participants are all of the other nodes in the system. The transaction is not committed in the prepare phase. Instead, all of the other nodes are merely told to prepare to commit. During the prepare phase, a node records enough information about the transaction so that it can subsequently either commit or abort and rollback the transaction. If all participants respond to the global coordinator that they are prepared, then the coordinator asks all nodes to commit the transaction. If any participants cannot prepare, then the coordinator asks all nodes to roll back the transaction. Prior to the prepare phase, locks are placed on the appropriate data and the data is updated, thereby preventing many types of collisions. This scheme relies on a transaction coordinator for both local and remote database updating. If there are a large number of nodes in the system, the transaction coordinator must actively manage the updating of all of the other nodes. The node coordination puts large processing demands on the transaction coordinator and requires a large amount of messaging to occur throughout the system. Due to its messaging nature, the two-phase commit mechanism is not used for efficient replication of distributed databases.

Accordingly, there is an unmet need for a collision avoidance scheme in a bidirectional database replication system that is relatively simple to implement, efficiently uses communication medium, scales efficiently and easily, prevents all types of collisions, and which does not place large demands on local application programs to perform complex node coordination duties. The present invention fulfills such a need.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings an embodiment that is presently preferred. It should be understood, however, that the invention is not limited to the precise arrangements and instrumentalities shown. In the drawings:

FIG. 3 shows a ready to commit table and audit trails used in the system of FIGS. 2A and 2B.

BRIEF SUMMARY OF THE INVENTION

Figure 1:
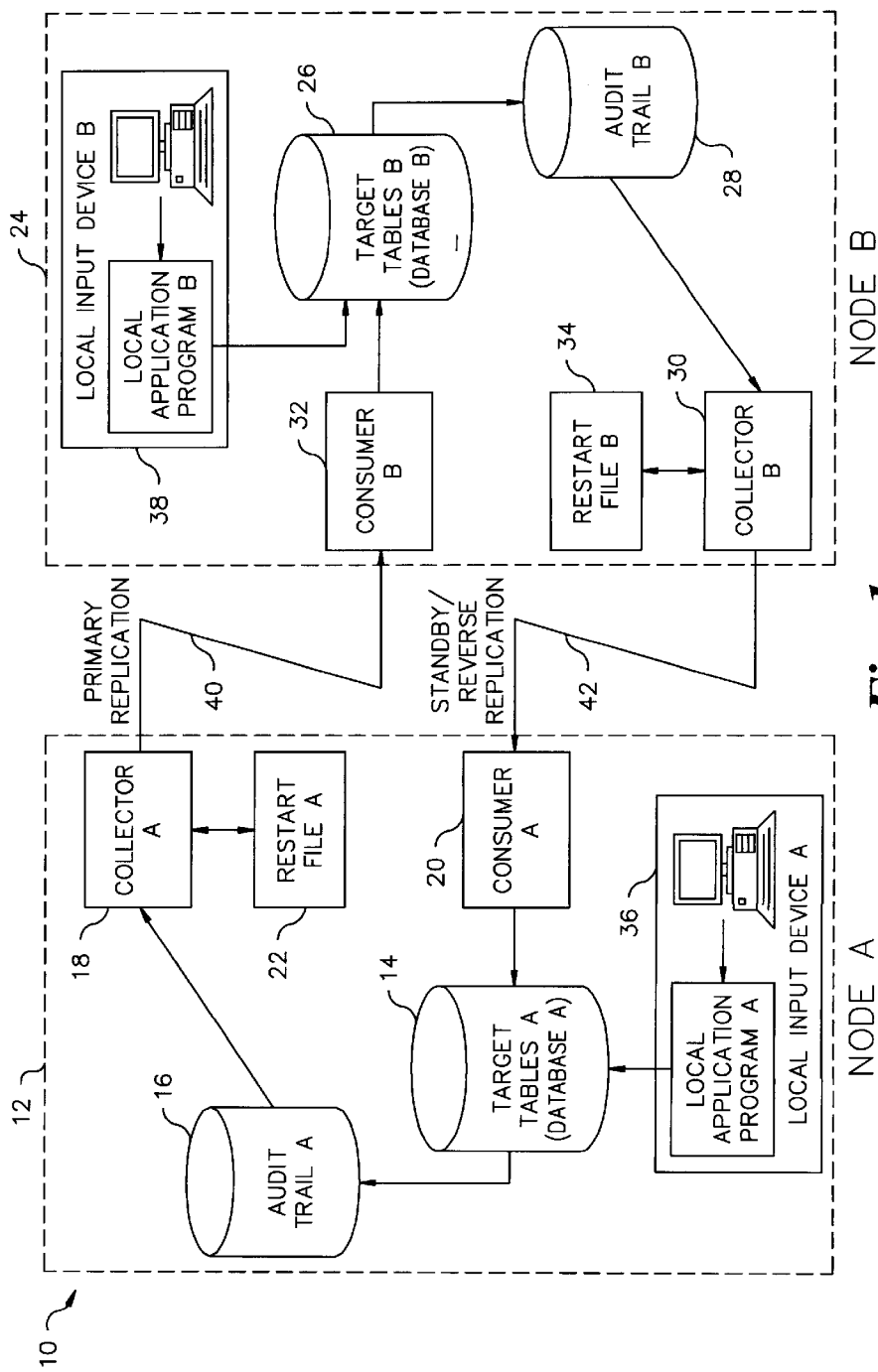
FIG. 1 is a schematic block diagram of a prior art bidirectional database replication system.

A bidirectional database replication system is provided that includes a plurality of nodes. Each node includes a database, a table that stores indicia of initiated transactions that are ready to be committed, but are not yet committed, and a transaction transmitter which sends selected transactions posted to the database and table entries to one or more other nodes. Each transaction being executed in the database of an originating node is paused prior to a commit operation. Then, indicia of the initiated transactions that are ready to be committed but that are not yet committed are entered into the table at the originating node. A ready to commit token is assigned to the transaction and entered into the table at the originating node. The transaction transmitter at the originating node sends the ready to commit tokens in the table of the originating node to the one or more other nodes. At each of the one or more receiving nodes, it is determined whether the database at the receiving node is prepared for a commit operation for the transaction corresponding to the received ready to commit token. If so, then the transaction transmitter in each of the other nodes sends back (selectively ping-pongs) the ready to commit token to the originating node. The commit operation of the transaction in the database of the originating node is executed only upon receipt from each of the other nodes in the system of the ready to commit token originally sent from the originating node for the transaction. In this manner, the commit operation for each transaction in the system is paused so as to allow all of the nodes in the system to prepare for the commit and thereby avoid collisions at all of the nodes in the system.

DETAILED DESCRIPTION OF THE INVENTION

Certain terminology is used herein for convenience only and is not to be taken as a limitation on the present invention.

In the drawings, the same reference letters are employed for designating the same elements throughout the several figures.

Definitions

The following definitions are provided to promote understanding of the invention. For clarity, the definitions are phrased with respect to a scheme that replicates only two databases. However, the scope of the invention includes schemes where replication occurs between more than two databases.

Replication—duplicating the contents of at least a portion of data records held in a source database to a target database. In the narrowest sense, replication involves duplicating the entire contents and format of the data records so that the two databases are totally identical, and thus interchangeable with each other. In the broadest sense, replication as defined herein involves duplicating at least the contents of a portion of the data records, and not necessarily duplicating the format of the data records. Replication thus may involve data transformation or filtering wherein the source data is altered in some manner before being applied to the target database. The concept of replication vs. transformation of data is discussed in more detail below.

Collector—an object or process that reads an audit trail or other transaction log file of a first database, extracts information about specified changes to the first database (e.g., insertions, updates, deletions), and passes that information to the consumer object or process defined below. In Shadowbase™ (a commercially available product made by ITI, Inc., Paoli, Pa.) executing on a COMPAQ NSK (Tandem) source, the collector-reads TMF or TM/MP audit trails. In a bidirectional database replication scheme, each of the two databases has an associated collector. The extractor process shown in FIG. 1 of U.S. Pat. No. 5,745,753 (Mosher, Jr.) assigned to Tandem Computers, Inc is similar in operation to the collector.

Transaction Transmitter—device or object which sends transactions posted to one database to the other database for replication in the other database. In one embodiment of the present invention, the transaction transmitter is identical to the collector. In other embodiments, the transaction transmitter performs some, but not all, of the functions of the collector. In a bidirectional database replication scheme, each of the two databases has an associated transaction transmitter.

Consumer—an object or process that takes messages about database changes that are passed by the collector object or process and applies those changes to the second database. In a bidirectional database replication scheme, each of the two databases has an associated consumer. The receiver process shown in FIG. 1 of Tandem's U.S. Pat. No. 5,745,753 is similar in concept to the consumer, except that the consumer described herein can process multi-threaded (i.e., overlapping) transactions, whereas the receiver process in the Tandem patent cannot process multi-threaded transactions.

Transaction Receiver—device or object which receives transactions sent by a transaction transmitter for posting to a database. In one embodiment of the present invention, the transaction receiver is identical to the consumer. In other embodiments, the transaction receiver performs some, but not all, of the functions of the consumer. In a bidirectional database replication scheme, each of the two databases has an associated transaction receiver.

Database—in the broadest sense, a database as defined herein comprises at least one table or file of data, or a portion of a table or file of data wherein the data is typically arranged in records called rows. In a narrower sense, a database is also a collection of tables or files, that is, multiple tables or files make up a database. Replication among databases thus has different meanings depending upon how the database is defined. Consider the following examples:

1. A system includes a single database which has two tables or files (i.e., two sub-databases) and the database replicates to itself. Replication thus maintains the two tables or files in the same state. The tables or files are in the same physical location, and each has a respective audit trail, collector and consumer.

2. A system includes a single database which has one table or file partitioned into two parts and the database replicates to itself. The first part has a plurality of records, and the second part has a plurality of records which must be kept in the same state as the first plurality of records. Replication thus maintains the two parts of the table or file in the same state. The two parts of the table or file are in the same physical location, and each has a respective audit trail, collector and consumer.

3. A system includes two databases, each located remotely from the other. Each database may have one or more tables or files, and the two remotely located databases replicate themselves. Replication thus maintains the two databases (including all of their respective tables or files) in the same state. The two databases are in different physical locations, and each has a respective audit trail, collector and consumer. In a typical scenario, each database resides at a different node within a network.

Table—alternative name for a database. In the preferred embodiment of the present invention, replication and copying of data is performed at the file level. However, other levels of replication/copying are within the scope of the invention, such as diskcopy-type operations which are used to create the databases 126 in FIG. 1 of Tandem's U.S. Pat. No. 5,745,753.

Primary Replication—effectively, unidirectional replication from a first database to a second database.

Row—effectively, a single record out of a database. A row update is an individual step defined to mean a modification (e.g., insert, update, delete) to the database.

Reverse Replication—effectively, unidirectional replication from the second database to the first database.

Transaction—A transaction is a unit of work consisting of one or more individual steps and/or operations to be applied to one or more local and/or remote databases as a single atomic unit of work. A characteristic of transactions is the requirement that either all steps and/or operations are applied or all are rolled back in the case of a problem so that the database(s) is always left in a consistent state. Transactions are often identified by a number or name called the transaction identifier. The transaction identifier is often, though not necessarily, unique. An example of an "individual step" would be to insert a record (row) into the database. An example of an "operation" would be the procedure which increases the price column of all rows in the database by 10%.

In an unaudited (non-transactional) database, each step or operation will be treated as a separate transactional unit of work. The commit step is akin to unlocking the column, row, page or table. The audit trail is akin to an application, system, replication, or other suitable log, disk cache, or change data file or storage medium.

Filtering—The operation of selectively choosing rows or transactions to replicate.

Restart—the steps that need to be taken in the event that one or more of the primary or secondary replication component(s) is unavailable and a restoration of the failed replication component(s) is needed. For example, if a communication channel fails, then any messages that were lost in transit need to be resent during the restart. The restart might be partial, (i.e., just certain or failed components get restarted), or total (i.e., all replication components are stopped and restarted). In either case, a non-transient source of information is needed to effectuate the restart, for instance, to tell the collectors where in the audit trail to start reading for transaction data. A restart file is often used for this purpose. In normal operation, the replication components periodically, or at certain events, log their current position to the restart file so that it can be used when a restart is needed. Some desirable aspects of effective restarts include: (1) few and non-complex system operator steps needed to effectuate the restart, (2) prevention of duplicate database updates from being applied to the target database, (3) restoration or elimination of missing database updates, and (4) minimal restart time.

Data Transformation—The scope of the present invention also includes schemes which perform transformation of data, instead of strict replication. Examples of transformations include:

1. Replicating Enscribe source data to SQL target tables.
2. Eliminating or adding columns or rows in a target.
3. Combining records from two source files or tables and writing them into one target file or table.
4. Changing the type, structure or length of a field.
5. Taking one source record and writing one target record for each occurrence of a particular field (e.g., data normalization).
6. Writing a source record to a target only when a field contains a specific value (conditional replication).

In the examples of the present invention described below, the first and second transaction transmitters are first and second collectors, the first and second transaction receivers are first and second consumers, and the first and second databases are first and second target tables. Also, the examples below presume that strict database replication occurs without any transformation of the contents of the data or its format. However, the scope of the invention includes bidirectional replication schemes wherein at least the contents of a portion of the data or its format are transformed.

FIG. 1 is a diagram of the infrastructure for a prior art bidirectional replication system 10 illustrated and described in U.S. Pat. No. 6,122,630. In this diagram, the two databases or target tables which must be kept in the same state are located remotely from each other at different nodes in a network. However, as discussed above, the two databases may be in the same physical state and may even represent the same database replicating to itself. Thus, the communication lines shown in FIGS. 2A and 2B may be merely internal data flow paths within a single computer memory, such as a bus line.

Referring to FIG. 1, the system 10 has a first node 12 comprising a first target table 14, a first audit trail 16, a first collector 18, a first consumer 20 and a restart file 22. The system 10 also has a second node 24 comprising a second target table 26, a second audit trail 28, a second collector 30, a second consumer 32 and a restart file 34. To simplify the explanation of the invention, the following terminology is used interchangeably:

first node 12—node A
first target table 14—target table A or database A
first audit trail 16—audit trail A
first collector 18—collector A
first consumer 20—consumer A
restart file 22—restart file A
second node 24—node B
second target table 26—target table B or database B
second audit trail 28—audit trail B
second collector 30—collector B
second consumer 32—consumer B
restart file 34—restart file B
combination of collector A and consumer B—primary replication subsystem
combination of collector B and consumer A—standby/reverse replication subsystem In addition to the elements above, one or both of the nodes A and B include one or more local input devices 36 and 38, referred to interchangeably as "local input device A" and "local input device B." The local input devices A and B make local modifications (e.g., inserts, updates and deletes) to the data in the respective databases A and B as part of a complete transaction in a similar manner as the application programs described in FIG. 1 of U.S. Pat. No. 6,122,630. Alternatively, the local input devices A and B may be located outside of the nodes A and B, and may be connected via a communication medium to the nodes. The local input devices A and B may be batch programs having no user or terminal I/O.

The databases A and B, audit trails A and B, collectors A and B and consumers A and B are connected together as discussed above in the definitions section. More particularly, the collector A is connected to the consumer B via communication medium 40 to provide primary replication, and the collector B is connected to the consumer A via communication medium 42 to provide standby/reverse replication.

In operation, any modifications made by the local input device A to the database A must be replicated in the database B. Likewise, any modifications made by the local input device B must be replicated to the database A.

The system 10 also includes restart files 22 and 34 connected to respective collectors 18 and 30. The function of the restart files 22 and 34 is described above in the "Definitions" section.

The system 10 preferably includes additional elements and steps to prevent ping-ponging of transactions, in addition to elements and steps for avoiding collisions. FIGS. 3–12 of U.S. Pat. No. 6,122,630 illustrate seven transaction ping-pong prevention schemes. For simplicity, the systems described herein do not show the ping-pong prevention schemes.

As discussed above, collisions may occur in database replication schemes. If a collision is detected, discrepancies between the plural database versions must be investigated and resolved by special programs or by the system operator. The present invention provides a scheme to prevent such collisions, thereby obviating the need for such special programs or system operator intervention.

Figure 2A:
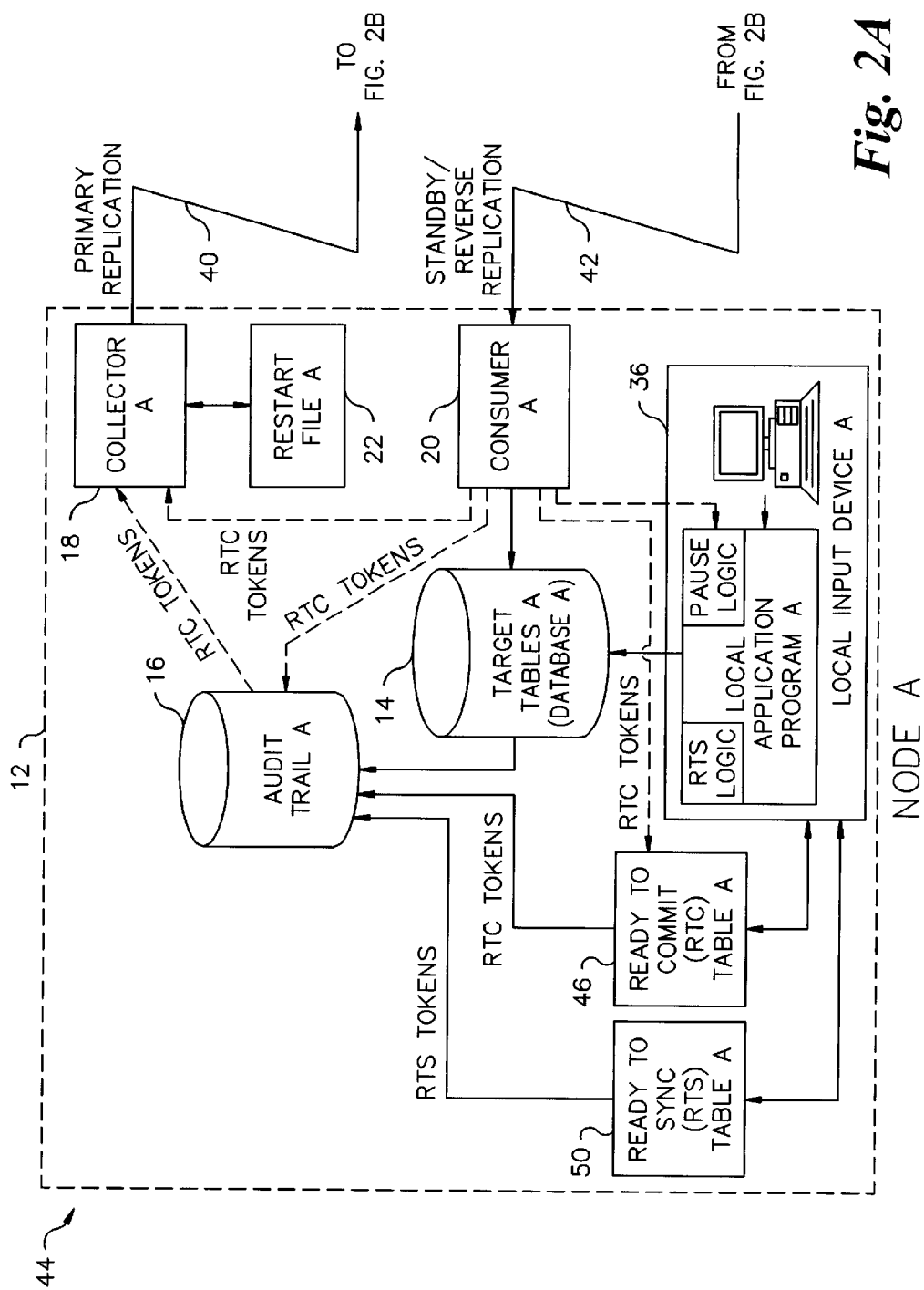
FIGS. 2A and 2B, taken together, is a schematic block diagram of a bidirectional database replication system having a collision avoidance scheme in accordance with the present invention.
Figure 2B:
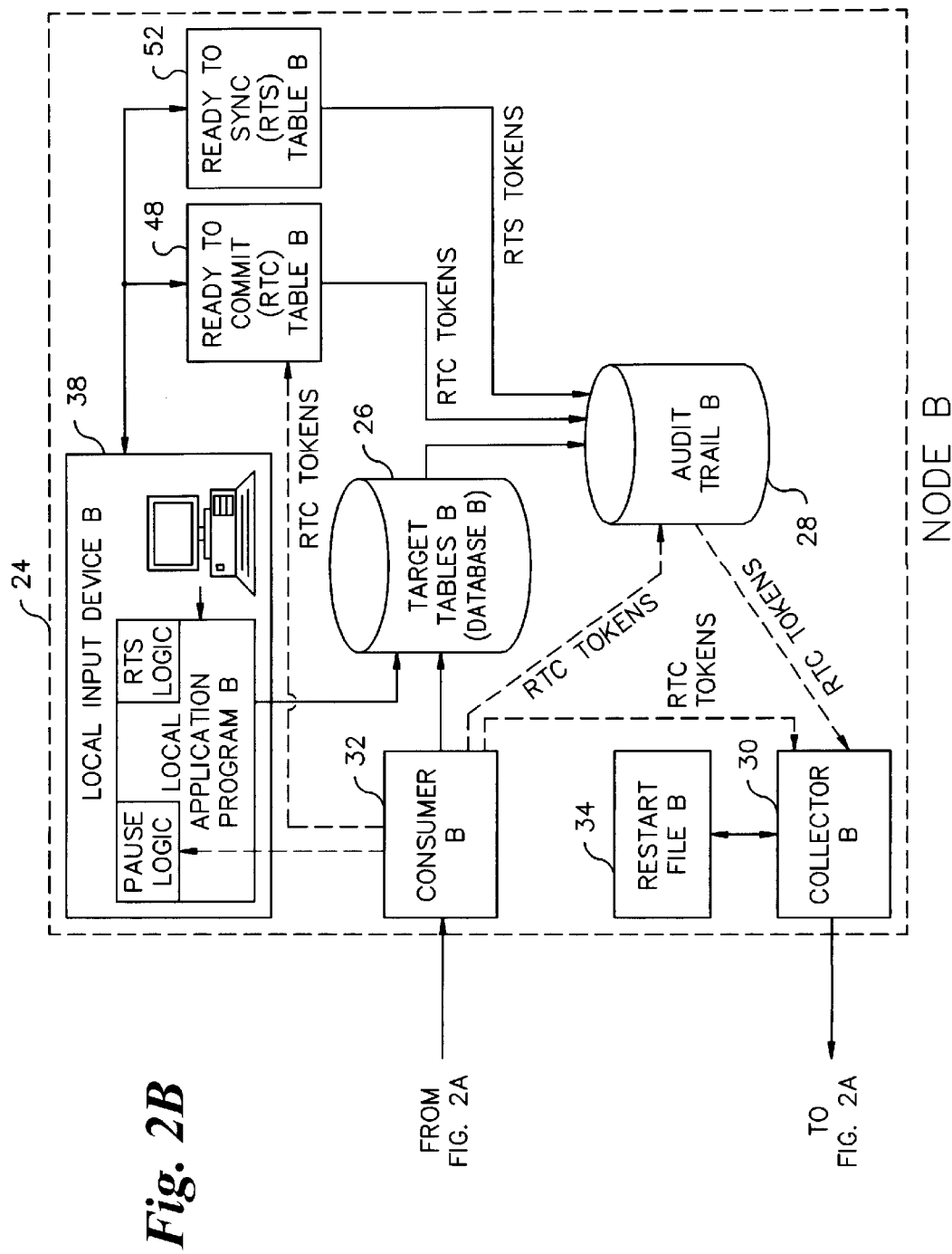

FIGS. 2A and 2B, taken together, shows one preferred embodiment of the present invention in the form of a system 44. FIG. 2 is similar to FIG. 1, except for the addition of a ready to commit table at each node, additional communication paths between the consumers and audit trails at each node, pause logic inside the local application programs, and a ready to sync table at each node (described later on in the disclosure). Specifically, node A includes ready to commit table 46 (hereafter, "RTC table A") and node B includes ready to commit table 48 (hereafter, "RTC table B"). An input of the RTC table A is connected to the output of the consumer A, and the output of the RTC table A is connected to the input of the audit trail A. The RTC table A is also in bidirectional communication with the local application program A of the local input device A. The RTC table B is connected in a similar manner to the corresponding elements of node B.

The RTC tables A and B may be separate elements of the system 44, as illustrated in FIGS. 2A and 2B, or they may be physically located in, or part of, the target tables, the consumers, or the local application programs.

FIG. 3 shows one preferred embodiment of an RTC table, here, RTC table A. The RTC table A contains indicia of transactions initiated at node A that are ready to be committed but that are not yet committed. The transactions in the ready to commit stage are paused. The RTC table A assigns and outputs a ready to commit token (hereafter, RTC token) to the audit trail A for each transaction in the table that represents a transaction initiated at node A and which is currently in the paused state. These tokens are then sent by the collector A to the other nodes in the system (here, only node B in this two node embodiment). When tokens initiated at node A are successfully returned (selectively ping-ponged) to node A, the respective transactions are completed (i.e., committed), and the respective entries in the ready to commit table are deleted. In one suitable scheme, the entries may have a flag which is initially given a first value that indicates a ready to commit state for the transaction, and is subsequently given a second value upon return of the respective token and completion of the commit operation that indicates a committed state for the transaction. The entry may then be deleted when the flag is given the second value.

The present invention is preferably implemented in conjunction with row or table locking, also referred to as row-level locking and table-level locking. The examples provided below use row locking. In multi-version data concurrency control, row-level locking is used when one or more internal fields of a row (i.e., columns) are being added, updated, or deleted. The appropriate rows are locked so that more than one user at a time cannot modify the rows of a particular table of data. The locks are released after the transaction is completed.

The present invention uses the row-level locking feature in conjunction with RTC tokens to ensure that the appropriate rows in each target table are locked before a transaction is committed at the originating node. When an RTC token is received back (returned) from each of the other nodes in the system 44, then the originating node knows that all of the other nodes in the system 44 have locked the appropriate rows and are ready to commit the transaction. Accordingly, the transaction can be committed without a risk of a collision occurring at one of the other nodes in the system 44. No such transaction pausing or RTC tokens are used in the prior art system 10.

To summarize, the return of the RTC token at the originating node from each of the other nodes in the system indicates that the corresponding rows in all of the replicated databases are locked before being updated and that the transaction may be committed without a possibility of a collision. If the RTC token fails to return or is prematurely returned with an error indication, this may indicate that a collision will occur if the transaction goes forward, and thus the transaction should not be committed.

FIG. 3 also shows an example of the contents of audit trail A and audit trail B, in conjunction with the contents of RTC table A. FIG. 3 illustrates a sample transaction having an identification number 101 wherein $10.00 is transferred from the account of John Smith to the account of Jane Doe. The transaction is started by local input device A at node A and is replicated at node B. At time t1, the local application program A begins transaction 101. The audit trail A thus includes an entry for this step. The BEGIN step is replicated to node B and thus appears in the audit trail B shortly thereafter, referred to herein as time $t_1+\alpha$. In some database systems, there is no separate BEGIN step. Instead, the first transaction step or transaction operation for a given transaction identifier is considered the BEGIN step. At time $t_2$, the local application program A requests to debit $10 from John Smith's account. John Smith's row is then locked and updated in target table A and the debit operation is entered into the audit trail A. The debit operation is then replicated to node B. John Smith's row is locked and updated in target table B and the debit operation is entered into the audit trail B shortly thereafter, at time $t_2+\alpha$. At time $t_3$, the local application program A requests to credit $10 to Jane Doe's account. Jane Doe's row is locked and updated in target table A and the credit operation is entered into the audit trail A. The credit operation is replicated to node B. Jane Doe's row is locked and updated in target table B and the credit operation is entered into the audit trail B shortly thereafter, at time $t_3+\alpha$.

At time $t_4$, the local application program A is ready to commit transaction 101. Instead of immediately initiating the COMMIT operation, the local application program enters an indicia of transaction 101 into the RTC table A. In this example, the indicia is the transaction identifier. However, the scope of the invention includes other forms of indicia. Optionally, a flag is set for the table entry. Here, the flag is initially set to zero. As described above, a token is generated for each new RTC table entry and is automatically sent to the audit trail A. Thus, at approximately time $t_4$, RTC token 101 is entered into the audit trail A. The RTC token 101 is sent to node B using the same conventional replication processes that replicate transaction steps or operations.

Upon receipt by the consumer B at node B of the RTC token 101, consumer B determines whether the appropriate transactions steps or operations that should have been received at node B prior to a commit operation were, in fact, received at node B. In this instance, it must be verified that the debit and credit transaction steps for John Smith and Jane Doe were received at node B, and therefore, their respective rows have been locked and updated. If so, the RTC token 101 is entered into the audit trail B at time $t4+\alpha$. Optionally, if no audit record is needed of RTC tokens received at node B, then the RTC token 101 may be sent directly from the consumer B to the collector B without being entered into the audit trail B. In this embodiment, there would be no entry in the audit trail B shown in FIG. 3 at time $t_4+\alpha$. This alternative scheme is represented by the dashed lines in FIG. 3 that connect the consumers and collectors. Since there is no entry in the audit trail B, this alternative scheme may be used when restart and sequencing issues do not arise.

Assuming that the RTC token 101 successfully makes it to the collector B, either directly from consumer B or from the audit trail B, then at time t5, the collector B sends the RTC token 101 back to node A where it is received by the consumer A. At approximately time $t_5$, the consumer A sends the RTC token 101 (or an indicia of transaction identifier 101) to the RTC table A. In the RTC table A, the flag for transaction identifier 101 is changed from zero to one, thereby indicating that the RTC token has been received at all nodes that must replicate the transaction, here only node B.

Alternatively, at time $t_5$, the consumer A may send the RTC token 101 directly to the pause logic of the local application program A, which, in turn, communicates with the RTC table A regarding which transactions are waiting to commit and which transactions can go forward with a commit step.

At time $t_6$, the transaction 101 is committed. The commit step is entered into the audit trail A and is replicated to node B for entry into the audit trail B at time $t_6+\alpha$. The row locks for John Smith and Jane Doe in the target tables A and B are removed after the commit step is completed.

Also, at time $t_6$, the table entry for transaction 101 may be deleted from the RTC table A. If table entries are not automatically deleted, then logic in the RTC tables is provided to prevent RTC tokens from being generated for any table entries that have a flag value equal to "1" or to prevent RTC tokens from being generated more than one time for each unique transaction identifier.

The consumers must process RTC tokens differently depending upon whether the tokens were originated from the consumer's own node or from another node. As described above, tokens that were not originated at the consumer's own node may be sent directly to the collector at the same node (after appropriate logic is executed to ensure that a token return is permissible), whereas tokens that were originated at the consumer's own node must be processed by the pause logic and ready to commit table of the same node to ensure that the transaction is committed if tokens from all other nodes are subsequently returned.

When a consumer receives an RTC token from a node other than its own node, the consumer must verify whether the appropriate transactions steps or operations that should have occurred prior to a commit operation have, in fact, been received and successfully applied at the consumer's node. In the example above, consumer B must verify that the debit and credit transaction operations were actually received and successfully applied at consumer B, and therefore the rows for John Smith and Jane Doe in target table B have been properly locked and updated. One suitable technique for accomplishing this task is to examine packet sequence numbers.

In the example above, the data packets for the BEGIN, DEBIT, CREDIT, COMMIT operations or steps, and the RTC tokens, will have sequential numbers for the respective transaction identifier. For example, one simplified example of numbers is as follows:

BEGIN—101.001
DEBIT—101.002
CREDIT—101.003
RTC TOKEN—101.004
COMMIT—101.005

In this example, when the consumer B receives the RTC token 101, the consumer B verifies whether sequence numbers 001 through 003 for transaction 101 were received. If so, then the consumer B can forward the RTC token 101 back to the originating node, here, node A if sequence numbers 001 through 003 have been successfully applied. If not, then the consumer B will not forward the RTC token 101 back to node A and the transaction will not be completed at either node. Alternatively, the consumer B will forward back the RTC token with an indication of failure attached thereto. This RTC token would be treated by the originating node as if the RTC token never returned. By preventing transactions from going forward if the appropriate rows or tables are not locked at each replicated database, collisions can be avoided.

If a flag is used in the RTC table, schemes other than the simple two logic stage flag are within the scope of the present invention. For example, the flag may represent the number of other nodes that the originating node must hear back from before committing the transaction. The flag may then be counted down to zero as tokens are returned.

To summarize some of the various different ways that a node processes incoming RTC tokens, as opposed to RTC tokens associated with locally initiated transactions, three different paths are shown in FIGS. 2A and 2B. First, the RTC tokens may be sent directly to the collector of the node after determining that the node is prepared for a commit operation for the transaction corresponding to the RTC token. Second, the RTC tokens may be sent to the RTC table at the node after determining that the node is prepared for a commit operation for the transaction corresponding to the RTC token. In this embodiment, the RTC token would pass through the RTC table at the node and be entered into the audit trail at the node. The RTC token would not be stored in the RTC table at the node, since the transaction was not initiated at the node. Third, the RTC tokens may be sent directly to the audit trail at the node after determining that the node is prepared for a commit operation for the transaction corresponding to the RTC token. The second and third embodiments allow the system to take advantage of the existing capabilities of the audit trail to replicate any entered transaction steps or operations to other nodes. In this manner, the RTC token may be treated by the audit trail just like any other transaction step or operation. In the first embodiment, additional instructions must be provided in the collectors regarding the processing of RTC tokens. Also, in the second and third embodiments wherein the RTC token is in the audit trail, serialization and proper sequencing of the database operations (both used for a restart operation) are ensured.

In an alternative embodiment of the present invention, the RTC token may be combined, either logically or physically, with the last transaction step or operation. This alternative embodiment may be used in an audited or an unaudited (non-transactional) database scheme.

Referring again to FIG. 3, transactions do not have to start and finish in sequence. For example, a transaction 102 may start after transaction 101 has begun, but before transaction 101 has been committed. Thus, there may be more than one uncommitted transaction at any point in time at each node, and thus more than one entry of an RTC transaction in the RTC tables at any one point in time.

To minimize unnecessary traffic in the communication lines between nodes, particularly in a system that has more than two nodes, logic is preferably provided in the consumers, collectors or audit trails to direct returning tokens only to the originating nodes (a form of selective ping-ponging). Accordingly, the packets that include RTC tokens also preferably include node origin information. To further minimize unnecessary traffic, logic may be provided in the consumers, collectors or audit trails to selectively block the ponging of commit transactions, since the ponging of RTC tokens may be used as a surrogate for a commit transaction.

Logic is also preferably provided in the consumers, collectors or audit trails to prevent ping-ponging of RTC tokens. Any of the schemes described in U.S. Pat. No. 6,122,630 may be used for this purpose.

In an alternative embodiment of the present invention, the RTC token is supplemented by one or more Ready to Sync (RTS) tokens which are created and propagated through the system 44 in a similar manner as the RTC token.

Some transactions have a very large number of steps or operations. As the succession of transaction steps or operations are performed, resources are allocated and data is locked. As the transaction approaches the commit operation, a large number of resources and data may be allocated and locked. These resources and data are not available for other transactions that may be occuring or waiting to occur. When using only the RTC token, the system 44 must wait until just before the commit operation to discover whether a collision would occur if the transaction is committed. It would be desirable if the system 44 can discover at an earlier stage in the transaction whether a collision may occur so that the transaction can be aborted earlier in the process, thereby freeing up system resources and locked data earlier in the process. The longer the transaction, the greater the advantage in detecting problems earlier in the transaction. It would also be desirable to know if certain parts of lengthy transactions have been safe-stored at all nodes.

To implement this alternative embodiment, selected intermediate points in a transaction are designated as checkpoints or restart points (hereafter, "sync points"). A sync point may occur after every N transaction steps or operations, or at selected significant transaction steps or operations. At each sync point, indicia of the transaction initiated at the originating node is entered into a Ready To Sync (RTS) table 50 or 52, hereafter, RTS table A and RTS table B shown in FIGS. 2A and 2B. The RTS tables A, B are similar in concept to the RTC tables A, B used for RTC tokens. The RTS tables A, B generate RTS tokens for each sync point, in a manner similar to generation of RTC tokens by the RTC tables A, B. The RTS tokens propagate through the system 44 in a similar manner as the RTC tokens (not shown in FIGS. 2A and 2B). When using RTS tokens, it is not necessary to pause the transaction to wait for a successful return of the RTS tokens from the other nodes before continuing with additional transaction steps or operations. Thus, there may be more than one RTS token propagating through the system 44 at one time for each transaction. Each RTS token is transmitted in sequence by the originating node collector. However, in an optional embodiment of the RTS scheme, the transaction may be paused to wait for a return of the RTS tokens from all nodes. The RTS tables A, B and the consumers A, B may use any of the schemes described above with respect to the RTC tables A, B, such as flags and sequence numbers, to track and monitor the sync process.

The RTS tables A, B may be part of the RTC tables A, B. The RTC tables A, B may be separate elements of the system 44, as illustrated in FIGS. 2A and 2B, or they may be physically located in, or part of, the target tables, the consumers, or the local application programs.

If a failure is detected that is indicative of a potential collision situation for the transaction up until the sync point (e.g., if all of the RTS tokens do not properly and/or timely return from the other nodes), then the transaction is stopped by logic in the local application program. Two types of transaction stopping are possible. In one mode, the entire transaction is aborted as described above when only an RTC token is used in a pause-before-commit process. In another mode, the transaction is restarted right after the last successful sync point. Since the transaction may be very lengthy, the ability to restart the transaction at an intermediate point has advantages over the all-or-nothing approach when using only an RTC token in a pause-before-commit process. In either mode, the use of RTS tokens allows the system 44 to provide earlier detection of collision situations, thereby allowing system resources and data files to be released and unlocked earlier in the transaction process. The use of the RTS tokens also allows the system 44 to know if certain parts of lengthy transactions have been safe-stored at all nodes.

The present invention may be implemented using column-level locking, row-level locking, page-level locking, or table-level locking. The type of locking depends upon the desired granularity level (i.e., the size of the object to be locked). The lowest granularity is at the column level, whereas the highest granularity is at the table level. Generally, the lower the lock granularity, the greater the number of users that can simultaneously access data in the table, because a smaller portion of the data is locked by each user.

The scope of the present invention is not limited to relational database management systems (RDBMS) having tables, rows and columns, but also includes corresponding elements in traditional, relational and conceptual data management systems, summarized as follows:

RDBMS: table, row, column
Traditional: file, record, field
Relational: relation, tuple, attribute
Conceptual: entity set, entity, attribute The present invention may also be implemented using data locking schemes other than direct row or table locking of the target tables. In one alternative embodiment, a lock table is maintained separate from the database manager locking scheme that directly controls the target tables. In this embodiment, updates (write requests) must go to the separate lock table first to check whether a row of a target table can be modified.

In some topologies, each node is not directly connected to every other node in the system, but instead indirectly communicates with some other nodes through other nodes. The scope of the present invention includes such topologies wherein RTC tokens and transaction data from an originating node are communicated to and from one or more receiving nodes via other nodes.

The present invention has significant advantages over distributed transaction schemes that also provide a degree of collision prevention, such as Oracle's two-phase commit. In the present invention, database replication is handled by elements and software that are independent of the elements and software that process locally initiated transactions and that post transactions to databases. In contrast, Oracle's two-phase commit scheme places all of these burdens on the local application software and transaction coordinator at each node. The present invention may be implemented with less node coordination than the Oracle scheme, thereby allowing for faster speed.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

Changes can be made to the embodiments described above without departing from the broad inventive concept thereof. The present invention is thus not limited to the particular embodiments disclosed, but is intended to cover modifications within the spirit and scope of the present invention.

What is claimed is:
1. A method of avoiding collisions in a bidirectional database replication system including a plurality of nodes connected via communication media in a topology, each node including (i) a database, (ii) a table that stores indicia of initiated transactions that are ready to be committed, but are not yet committed, and (iii) a transaction transmitter, each transaction being one or more transaction steps or transaction operations, the method comprising:

(a) the transaction transmitter of an originating node sending selected transactions posted to the database of the originating node to one or more other nodes for replication at the one or more other nodes;

b) pausing each transaction being executed in a database of an originating node prior to a commit operation for the transaction;

(c) entering into the table at the originating node, indicia of the initiated transactions that are ready to be committed but that are not yet committed, and assigning a ready to commit token to the transaction;

(d) the transaction transmitter at the originating node sending the ready to commit tokens in the table of the originating node to the one or more other nodes;

(e) determining at each of the one or more other nodes whether the database at the one or more other nodes is prepared for a commit operation for the transactions corresponding to each received ready to commit tokens, and, if so, the transaction transmitter in each of the other nodes sends back the ready to commit tokens to the respective originating node; and (f) executing the commit operation of the transaction in the database of the originating node only upon receipt from each of the other nodes in the system of the ready to commit token originally sent from the originating node for the transaction, wherein the commit operation for each transaction in the system is paused so as to allow all of the nodes in the system to prepare for the commit and thereby avoid collisions at all of the nodes in the system.

2. The method of claim 1 wherein step (d) further comprises the transaction transmitter at the originating node sending transactions posted to the originating database to the databases at the one or more other nodes for replication and posting therein.

3. The method of claim 2 wherein each node further comprises (iv) a local application program that controls the progression of the transaction with respect to only its own node, and the transaction transmitters at each node send transactions posted to the originating database to the databases at the one or more other nodes for replication and posting therein independent of the local application program.

4. The method of claim 2 further comprising:

(g) locking the row in the database associated with the transaction at each node in the system, wherein the return of the ready to commit token at the originating node from the other nodes in the system indicates that the corresponding rows in all of the replicated databases are locked and that the transaction may be committed without a possibility of a collision.

5. The method of claim 1 wherein each node further comprises (iv) an audit trail connected to the database and to the table, the audit trail containing all transactions posted to the database and all table entries, wherein the transaction transmitter sends selected audit trail entries to the one or more nodes, and in step (c), the ready to commit token is entered into the audit trail at the originating node, and in step (d), the transaction transmitter at the originating node sends the ready to commit tokens in the audit trail that were obtained from the table of the originating node to the one or more other nodes.

6. The method of claim 1 wherein step (c) further comprises associating a flag for each transaction in the table that is ready to be committed, wherein the flag has a first state when the ready to commit token for the transaction has not yet been returned from all of the other nodes, and the flag has a second state when the ready to commit token for the transaction has been returned from all of the other nodes, the system allowing the transaction to be committed when the flag becomes changed from the first state to the second state.

7. The method of claim 1 further comprising:

(g) deleting any table entries when the ready to commit token for the transaction has been returned from all of the other nodes and the commit operation for the associated transaction has been executed.

8. The method of claim 1 wherein step (e) further comprises comparing the sequence number of any received ready to commit tokens to an expected sequence number to determine if the node has previously received the transaction steps or operations corresponding to the transaction of the ready to commit token, and thus is prepared for a commit operation.

9. An article of manufacture for avoiding collisions in a bidirectional database replication system including a plurality of nodes connected via communication media in a topology, each node including (i) a database, (ii) a table that stores indicia of initiated transactions that are ready to be committed, but are not yet committed, and (iii) a transaction transmitter, each transaction being one or more transaction steps or transaction operations, the article of manufacture comprising a computer-readable medium holding computer-executable instructions for performing a method comprising:

(a) the transaction transmitter of an originating node sending selected transactions posted to the database of the originating node to one or more other nodes for replication at the one or more other nodes;

(b) pausing each transaction being executed in a database of an originating node prior to a commit operation for the transaction;

(c) entering into the table at the originating node, indicia of the initiated transactions that are ready to be committed but that are not yet committed, and assigning a ready to commit token to the transaction;

(d) the transaction transmitter at the originating node sending the ready to commit tokens in the table of the originating node to the one or more other nodes;

(e) determining at each of the one or more other nodes whether the database at the one or more other nodes is prepared for a commit operation for the transactions corresponding to each received ready to commit tokens, and, if so, the transaction transmitter in each of the other nodes sends back the ready to commit tokens to the respective originating node; and (f) executing the commit operation of the transaction in the database of the originating node only upon receipt from each of the other nodes in the system of the ready to commit token originally sent from the originating node for the transaction, wherein the commit operation for each transaction in the system is paused so as to allow all of the nodes in the system to prepare for the commit and thereby avoid collisions at all of the nodes in the system.

10. The article of manufacture of claim 9 wherein step (d) further comprises the transaction transmitter at the originating node sending transactions posted to the originating database to the databases at the one or more other nodes for replication and posting therein.

11. The article of manufacture of claim 10 wherein each node further comprises (iv) a local application program that controls the progression of the transaction with respect to only its own node, and the transaction transmitters at each node send transactions posted to the originating database to the databases at the one or more other nodes for replication and posting therein independent of the local application program.

12. The article of manufacture of claim 10 wherein the computer-executable instructions perform a method further comprising:
  (g) locking the row in the database associated with the transaction at each node in the system, wherein the return of the ready to commit token at the originating node from the other nodes in the system indicates that the corresponding rows in all of the replicated databases are locked and that the transaction may be committed without a possibility of a collision.

13. The article of manufacture of claim 9 wherein each node further comprises (iv) an audit trail connected to the database and to the table, the audit trail containing all transactions posted to the database and all table entries, wherein the transaction transmitter sends selected audit trail entries to the one or more nodes, and in step (c), the ready to commit token is entered into the audit trail at the originating node, and in step (d), the transaction transmitter at the originating node sends the ready to commit tokens in the audit trail that were obtained from the table of the originating node to the one or more other nodes.

14. The article of manufacture of claim 9 wherein step (c) further comprises associating a flag for each transaction in the table that is ready to be committed, wherein the flag has a first state when the ready to commit token for the transaction has not yet been returned from all of the other nodes, and the flag has a second state when the ready to commit token for the transaction has been returned from all of the other nodes, the system allowing the transaction to be committed when the flag becomes changed from the first state to the second state.

15. The article of manufacture of claim 9 wherein the computer-executable instructions perform a method further comprising:
  (g) deleting any table entries when the ready to commit token for the transaction has been returned from all of the other nodes and the commit operation for the associated transaction has been executed.

16. The article of manufacture of claim 9 wherein step (e) further comprises comparing the sequence number of any received ready to commit tokens to an expected sequence number to determine if the node has previously received the transaction steps or operations corresponding to the transaction of the ready to commit token, and thus is prepared for a commit operation.

17. An apparatus for avoiding collisions in a bidirectional database replication system including a plurality of nodes connected via communication media in a topology, each node including (i) a database, (ii) a table that stores indicia of initiated transactions that are ready to be committed, but are not yet committed, and (iii) a transaction transmitter, each transaction being one or more transaction steps or transaction operations, the apparatus comprising:
  (a) a transaction transmitter of an originating node which sends selected transactions posted to the database of the originating node to one or more other nodes for replication at the one or more other nodes;
  (b) means for pausing each transaction being executed in a database of an originating node prior to a commit operation for the transaction;
  (c) means for entering into the table at the originating node, indicia of the initiated transactions that are ready to be committed but that are not yet committed, and assigning a ready to commit token to the transaction, the transaction transmitter at the originating node sending the ready to commit tokens in the table of the originating node to the one or more other nodes;
  (d) means for determining at each of the one or more other nodes whether the database at the one or more other nodes is prepared for a commit operation for the transactions corresponding to each received ready to commit tokens, and, if so, the transaction transmitter in each of the other nodes sends back the ready to commit tokens to the respective originating node; and
  (e) means for executing the commit operation of the transaction in the database of the originating node only upon receipt from each of the other nodes in the system of the ready to commit token originally sent from the originating node for the transaction, wherein the commit operation for each transaction in the system is paused so as to allow all of the nodes in the system to prepare for the commit and thereby avoid collisions at all of the nodes in the system.

18. The apparatus of claim 17 wherein the transaction transmitter at the originating node also sends transactions posted to the originating database to the databases at the one or more other nodes for replication and posting therein.

19. The apparatus of claim 18 wherein each node further comprises (iv) a local application program that controls the progression of the transaction with respect to only its own node, and the transaction transmitters at each node send transactions posted to the originating database to the databases at the one or more other nodes for replication and posting therein independent of the local application program.

20. The apparatus of claim 18 further comprising:
  (f) means for locking the row in the database associated with the transaction at each node in the system, wherein the return of the ready to commit token at the originating node from the other nodes in the system indicates that the corresponding rows in all of the replicated databases are locked and that the transaction may be committed without a possibility of a collision.

21. The apparatus of claim 17 wherein each node further comprises (iv) an audit trail connected to the database and to the table, the audit trail containing all transactions posted to the database and all table entries, wherein the transaction transmitter sends selected audit trail entries to the one or more nodes, the ready to commit token is entered into the audit trail at the originating node, and the transaction transmitter at the originating node sends the ready to commit tokens in the audit trail that were obtained from the table of the originating node to the one or more other nodes.

22. The apparatus of claim 17 further comprising:
  (f) a flag associated with each transaction in the table that is ready to be committed, wherein the flag has a first state when the ready to commit token for the transaction has not yet been returned from all of the other nodes, and the flag has a second state when the ready to commit token for the transaction has been returned from all of the other nodes, the system allowing the transaction to be committed when the flag becomes changed from the first state to the second state.

23. The apparatus of claim 17 further comprising:
(f) means for deleting any table entries when the ready to commit token for the transaction has been returned from all of the other nodes and the commit operation for the associated transaction has been executed.

24. The apparatus of claim 17 wherein the means for determining further comprises means for comparing the sequence number of any received ready to commit tokens to an expected sequence number to determine if the node has previously received the transaction steps or operations corresponding to the transaction of the ready to commit token, and thus is prepared for a commit operation.

25. A method of avoiding collisions in a bidirectional database replication system including a plurality of nodes connected via communication media in a topology, each node including (i) a database, (ii) a table that stores indicia of initiated transactions that are at one or more predesignated intermediate points in the transaction but are not yet committed, and (iii) a transaction transmitter, each transaction being one or more transaction steps or transaction operations, the method comprising:
(a) the transaction transmitter of an originating node sending selections transactions posted to the database of the originating node to one or more other nodes for replication at the one or more other nodes;
(b) entering into the table at the originating node, indicia of the initiated transactions that are at one or more predesignated intermediate points in the transaction but are not yet committed, and assigning a ready to sync token to the transaction at each of the predesignated intermediate points;
(c) the transaction transmitter at the originating node sending the ready to sync tokens in the table of the originating node to the one or more other nodes;
(d) determining at each of the one or more other nodes whether the database at the one or more other nodes is prepared to properly process the transaction up to the intermediate point associated with the respective ready to sync token, and, if so, the transaction transmitter in each of the other nodes sends back the ready to sync tokens to the respective originating node; and
(e) stopping the execution of a transaction in the system if the originating node fails to receive back a ready to sync token from at least one of the other nodes in the system for any of the predesignated intermediate points, wherein the transaction continues to execute as long as all ready to sync tokens properly return to the originating node, thereby indicating that no collisions should occur at any of the nodes in the system up to the most recent intermediate point in the transaction.

26. The method of claim 25 further comprising:
(f) if the execution of a transaction is stopped, restarting the transaction at the beginning of the predesignated intermediate point associated with the ready to sync token that failed to properly return from a node.

27. The method of claim 26 wherein the predesignated intermediate points occur at every N transaction steps or operations.

28. The method of claim 26 wherein each node further comprises (iv) an audit trail connected to the database and to the table, the audit trail containing all transactions posted to the database and all table entries, wherein the transaction transmitter sends selected audit trail entries to the one or more nodes, and in step (c), the ready to sync token is entered into the audit trail at the originating node, and in step (d), the transaction transmitter at the originating node sends the ready to sync tokens in the audit trail that were obtained from the table of the originating node to the one or more other nodes.

29. An article of manufacture for avoiding collisions in a bidirectional database replication system including a plurality of nodes connected via communication media in a topology, each node including (i) a database, (ii) a table that stores indicia of initiated transactions that are at one or more predesignated intermediate points in the transaction but are not yet committed, and (iii) a transaction transmitter, each transaction being one or more transaction steps or transaction operations, the article of manufacture comprising a computer-readable medium holding computer-executable instructions for performing a method comprising:
(a) the transaction transmitter of an originating node sending selections transactions posted to the database of the originating node to one or more other nodes for replication at the one or more other nodes;
(b) entering into the table at the originating node, indicia of the initiated transactions that are at one or more predesignated intermediate points in the transaction but are not yet committed, and assigning a ready to sync token to the transaction at each of the predesignated intermediate points;
(c) the transaction transmitter at the originating node sending the ready to sync tokens in the table of the originating node to the one or more other nodes;
(d) determining at each of the one or more other nodes whether the database at the one or more other nodes is prepared to properly process the transaction up to the intermediate point associated with the respective ready to sync token, and, if so, the transaction transmitter in each of the other nodes sends back the ready to sync tokens to the respective originating node; and
(e) stopping the execution of a transaction in the system if the originating node fails to receive back a ready to sync token from at least one of the other nodes in the system for any of the predesignated intermediate points, wherein the transaction continues to execute as long as all ready to sync tokens properly return to the originating node, thereby indicating that no collisions should occur at any of the nodes in the system up to the most recent intermediate point in the transaction.

30. The article of manufacture of claim 29 wherein the computer-executable instructions perform a method further comprising:
(e) if the execution of a transaction is stopped, restarting the transaction at the beginning of the predesignated intermediate point associated with the ready to sync token that failed to properly return from a node.

31. The article of manufacture of claim 29 wherein the predesignated intermediate points occur at every N transaction steps or operations.

32. The article of manufacture of claim 29 wherein each node further comprises (iv) an audit trail connected to the database and to the table, the audit trail containing all transactions posted to the database and all table entries, wherein the transaction transmitter sends selected audit trail entries to the one or more nodes, and in step (c), the ready to sync token is entered into the audit trail at the originating node, and in step (d), the transaction transmitter at the originating node sends the ready to sync tokens in the audit trail that were obtained from the table of the originating node to the one or more other nodes.

33. An apparatus for avoiding collisions in a bidirectional database replication system including a plurality of nodes connected via communication media in a topology, each node including (i) a database, (ii) a table that stores indicia of initiated transactions that are at one or more predesignated intermediate points in the transaction but are not yet committed, and (iii) a transaction transmitter, each transaction being one or more transaction steps or transaction operations, the apparatus comprising:

(a) a transaction transmitter of an originating node which sends selected transactions posted to the database of the originating node to one or more other nodes for replication at the one or more other nodes;

(b) means for entering into the table at the originating node, indicia of the initiated transactions that are at one or more predesignated intermediate points in the transaction but are not yet committed, and assigning a ready to sync token to the transaction at each of the predesignated intermediate points, the transaction transmitter at the originating node sending the ready to sync tokens in the table of the originating node to the one or more other nodes;

(c) means for determining at each of the one or more other nodes whether the database at the one or more other nodes is prepared to properly process the transaction up to the intermediate point associated with the respective ready to sync token, and, if so, the transaction transmitter in each of the other nodes sends back the ready to sync tokens to the respective originating node; and (d) means for stopping the execution of a transaction in the system if the originating node fails to receive back a ready to sync token from at least one of the other nodes in the system for any of the predesignated intermediate points, wherein the transaction continues to execute as long as all ready to sync tokens properly return to the originating node, thereby indicating that no collisions should occur at any of the nodes in the system up to the most recent intermediate point in the transaction.

34. The apparatus of claim 33 further comprising:

(e) means for restarting the transaction at the beginning of the predesignated intermediate point associated with the ready to sync token that failed to properly return from a node if the execution of a transaction is stopped.

35. The apparatus of claim 33 wherein the predesignated intermediate points occur at every N transaction steps or operations.

36. The apparatus of claim 33 wherein each node further comprises (iv) an audit trail connected to the database and to the table, the audit trail containing all transactions posted to the database and all table entries, wherein the transaction transmitter sends selected audit trail entries to the one or more nodes, and the ready to sync token is entered into the audit trail at the originating node, and the transaction transmitter at the originating node sends the ready to sync tokens in the audit trail that were obtained from the table of the originating node to the one or more other nodes.

37. A method of replicating data in a database replication system including a source database and a target database, each transaction being one or more transaction steps or transaction operations, the method comprising:

(a) sending to the target database any transaction steps or operations that are received and posted at the source database, the transaction steps or operations that are received and posted at the source database thereby being replicated to the target database;

(b) pausing each transaction being executed in the source database prior to a commit operation for the transaction, (c) assigning a ready to commit token to the transaction;

(d) sending the ready to commit token to the target database only after all transaction steps or operations prior to the commit operation for the transaction have been posted to the source database;

(e) determining whether the target database is prepared for a commit operation for the transaction corresponding to the ready to commit token, and, if so, sending back the ready to commit token to the source database; and (f) executing a commit operation at the source database for a transaction only upon receipt from the target database of the ready to commit token originally sent from the source database for the respective transaction, wherein the commit operation for each transaction in the system is paused so as to allow the source and the target database to prepare for the commit.

38. The method of claim 37 wherein both the source and the target database can both independently receive and post transactions and replicate the transactions to the other database.

39. The method of claim 37 wherein the transaction associated with a ready to commit token is posted to the source database upon receipt of the respective ready to commit token at the source database, wherein step (a) further comprises, sending to the target database any transaction steps or operations other than commit operations that are received and posted at the source databases; the method further comprising:

(g) sending to the target database any commit operations posted to the source database for replication and posting therein.

40. An apparatus for replicating data in a database replication system including a source database and a target database, each transaction being one or more transaction steps or transaction operations, the apparatus comprising:

(a) means for sending to the target database any transaction steps or operations that are received and posted at the source database, the transaction steps or operations that are received and posted at the source database thereby being replicated to the target database;

(b) means for pausing each transaction being executed in the source database prior to a commit operation for the transaction;

(c) means for assigning a ready to commit token to the transaction;

(d) means for sending the ready to commit token to the target database;

(e) means for determining whether the target database is prepared for a commit operation for the transaction corresponding to the ready to commit token, and, if so, sending back the ready to commit token to the source database; and (f) means for executing a commit operation at the source database for a transaction only upon receipt from the target database of the ready to commit token originally sent from the source database for the respective transaction, wherein the commit operation for each transaction in the system is paused so as to allow the source and the target database to prepare for the commit.

41. The apparatus of claim 40 wherein both the source and the target database can both independently receive and post transactions and replicate the transactions to the other database.

42. The apparatus of claim 40 wherein the transaction associated with a ready to commit token is posted to the source database upon receipt of the respective ready to commit token at the source database:

wherein the means for sending to the target database, sends any transaction steps or operations other than commit operations that are received and posted at the source database prior to any pausing operation; and also sends to the target database any commit operations posted to the source database for replication and posting therein.

* * * * *